United States Patent [19]
Perevozchikov

[11] Patent Number: 6,139,291
[45] Date of Patent: Oct. 31, 2000

[54] SCROLL MACHINE WITH DISCHARGE VALVE

[75] Inventor: Michael M. Perevozchikov, Troy, Ohio

[73] Assignee: Copeland Corporation, Sidney, Ohio

[21] Appl. No.: 09/274,724

[22] Filed: Mar. 23, 1999

[51] Int. Cl.[7] .............................. F01C 1/04; F04C 18/00
[52] U.S. Cl. ........................ 418/55.1; 418/63; 418/270;
137/885; 137/856; 137/252.3
[58] Field of Search ........................... 418/55.1, 63, 270;
137/525.3, 855, 856; 417/566; 60/578

[56] References Cited

U.S. PATENT DOCUMENTS

| | | |
|---|---|---|
| 550,730 | 12/1895 | Stone . |
| 1,359,006 | 11/1920 | Wardwell . |
| 1,593,519 | 7/1926 | Underwood . |
| 2,646,071 | 7/1953 | Wagner . |
| 2,899,981 | 8/1959 | Binks ...................................... 137/855 |
| 2,908,109 | 10/1959 | Rotwein . |
| 3,060,959 | 10/1962 | Foster . |
| 3,176,712 | 4/1965 | Ramsden . |
| 3,516,766 | 6/1970 | Monden et al. .......................... 418/63 |
| 3,568,712 | 3/1971 | Rinehart ............................. 137/252.3 |
| 3,790,311 | 2/1974 | Butts et al. . |
| 3,891,000 | 6/1975 | Melnick .............................. 137/525.3 |
| 4,277,955 | 7/1981 | Parker . |
| 4,369,808 | 1/1983 | Hagman . |
| 4,369,812 | 1/1983 | Paradis et al. . |
| 4,427,351 | 1/1984 | Sano ........................................ 418/63 |
| 4,431,388 | 2/1984 | Eber et al. . |
| 4,513,784 | 4/1985 | Farrand et al. . |
| 4,531,543 | 7/1985 | Markley . |
| 4,560,330 | 12/1985 | Murayama et al. . |
| 4,580,604 | 4/1986 | Kawagachi et al. ..................... 137/856 |
| 4,744,737 | 5/1988 | Yamamura et al. . |
| 4,759,696 | 7/1988 | Ishiai . |
| 4,826,409 | 5/1989 | Kohayakawa et al. ................... 418/63 |
| 4,904,165 | 2/1990 | Fraser, Jr. et al. . |
| 5,062,779 | 11/1991 | Da Costa ................................. 418/270 |
| 5,141,420 | 8/1992 | Nambiar . |
| 5,407,335 | 4/1995 | Caillat et al. .......................... 418/55.1 |
| 5,411,384 | 5/1995 | Bass et al. ............................ 418/55.1 |
| 5,593,294 | 1/1997 | Houghtby et al. ..................... 418/55.1 |

FOREIGN PATENT DOCUMENTS 56-6093   1/1981   Japan ..................................... 418/270

*Primary Examiner*—Thomas Denion
*Assistant Examiner*—Thai-Ba Trieu
*Attorney, Agent, or Firm*—Harness, Dickey & Pierce, P.L.C.

[57] ABSTRACT

A compressor includes a normally open discharge valve assembly for controlling compressed refrigerant flow from the discharge chamber through the compression members. This controlling of flow results in an increased performance for the compressor by reducing recompression volume and the elimination of reverse rotation at shut down. The discharge valve assembly includes a valve seat, a valve plate and a valve stop secured within a recess formed within the compressor. The valve stop and the valve seat include a contoured surface which is engaged by the valve plate when it opens and closes. The contoured surface control the movement of the valve plate.

30 Claims, 7 Drawing Sheets

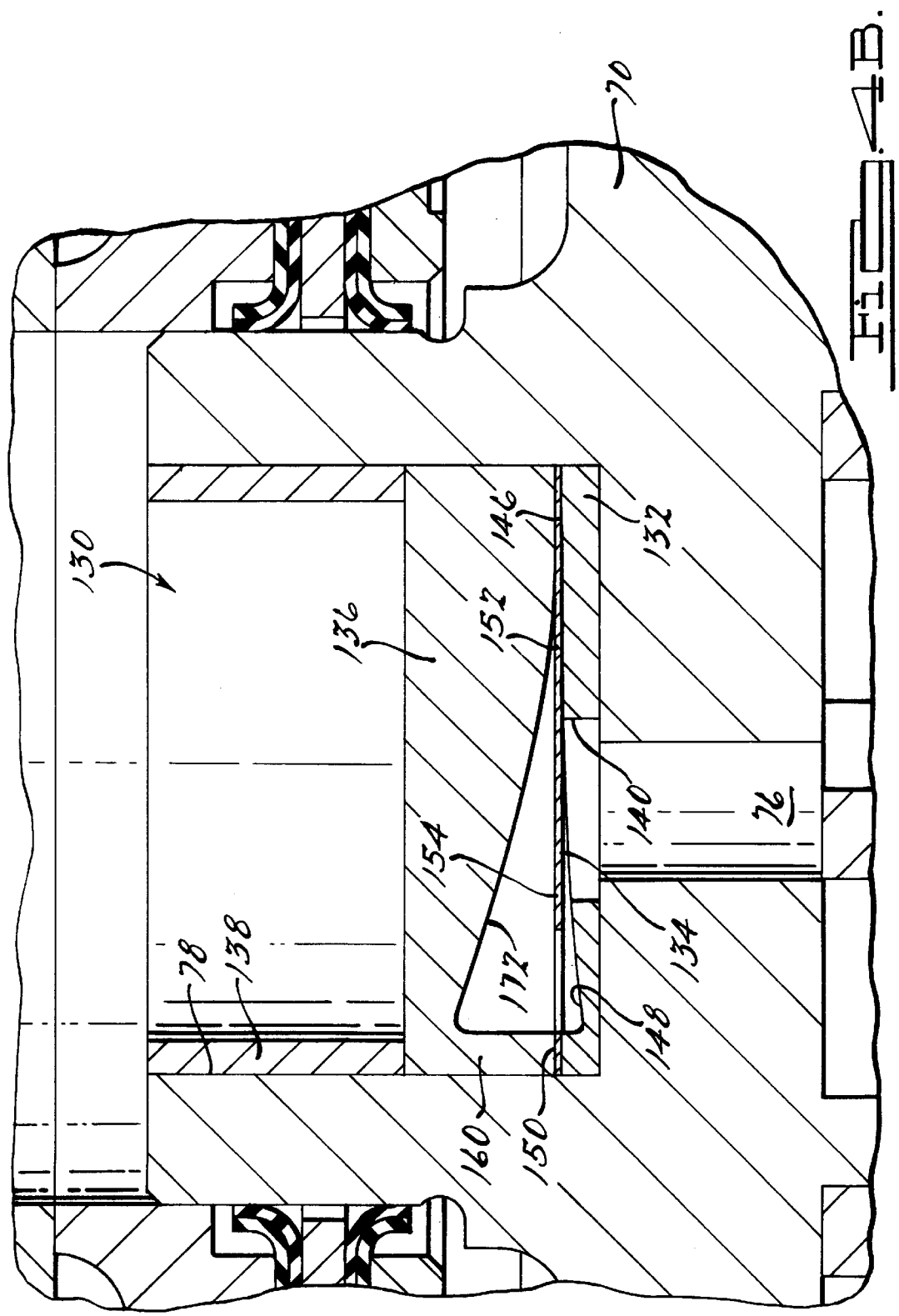

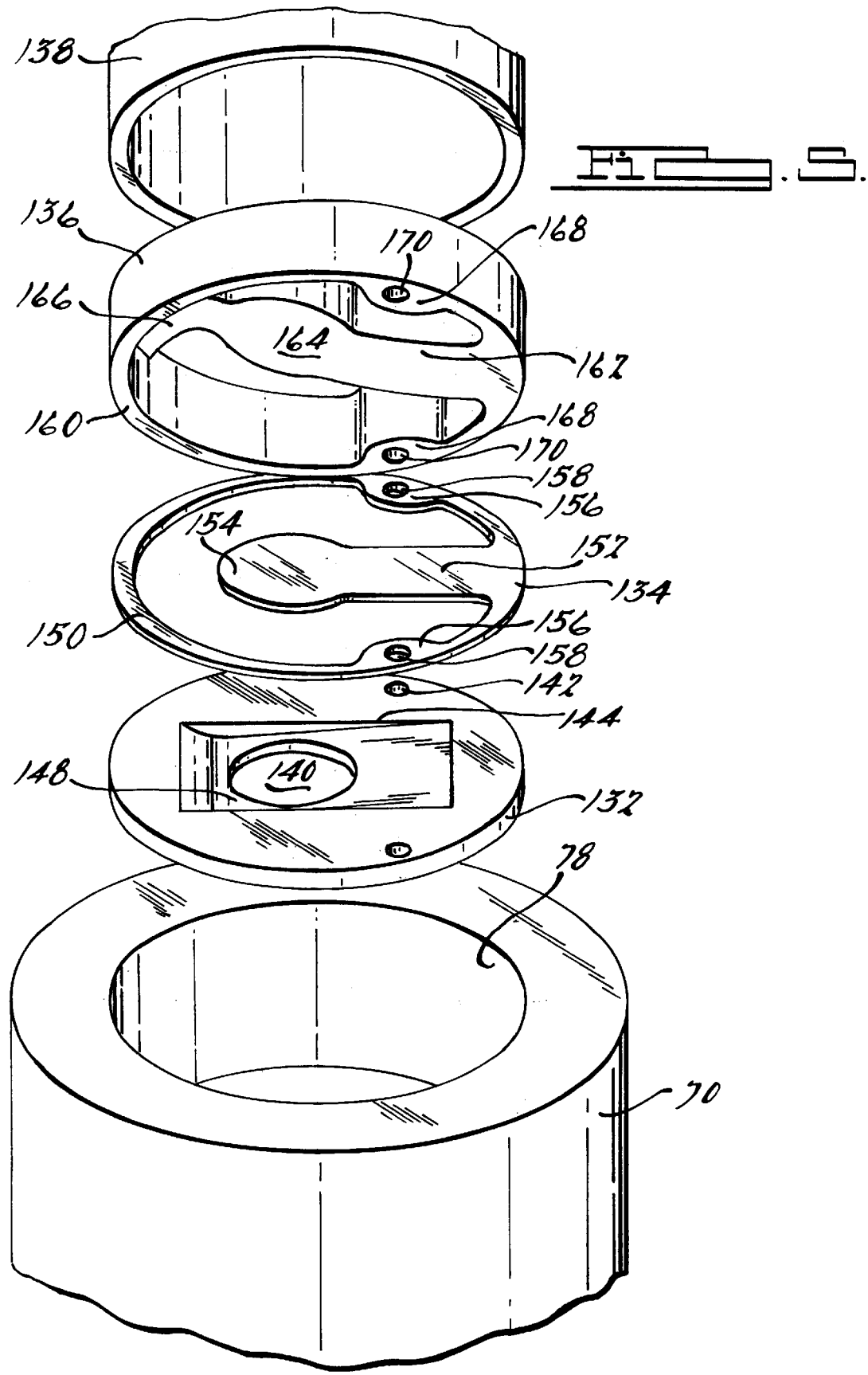

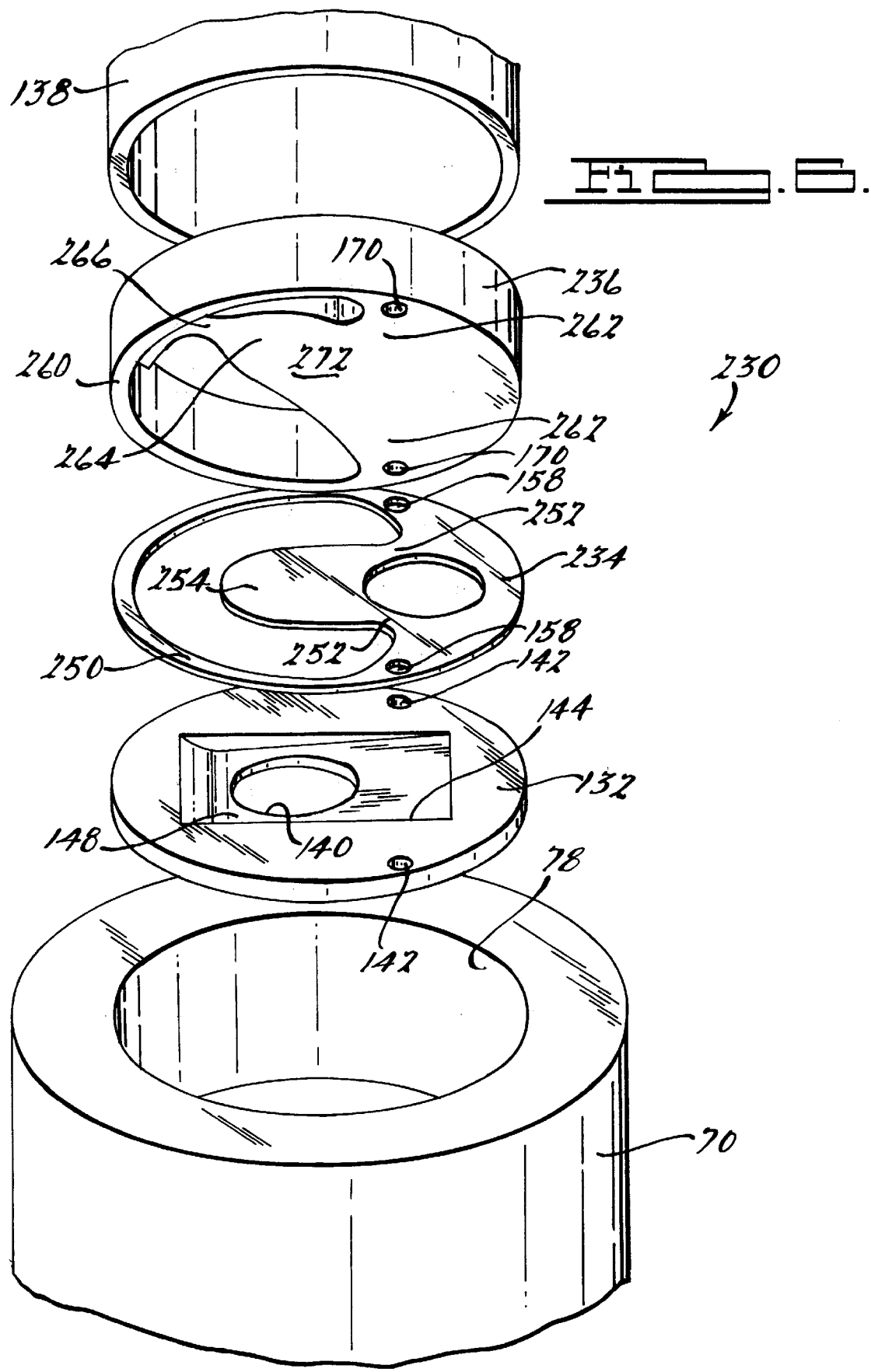

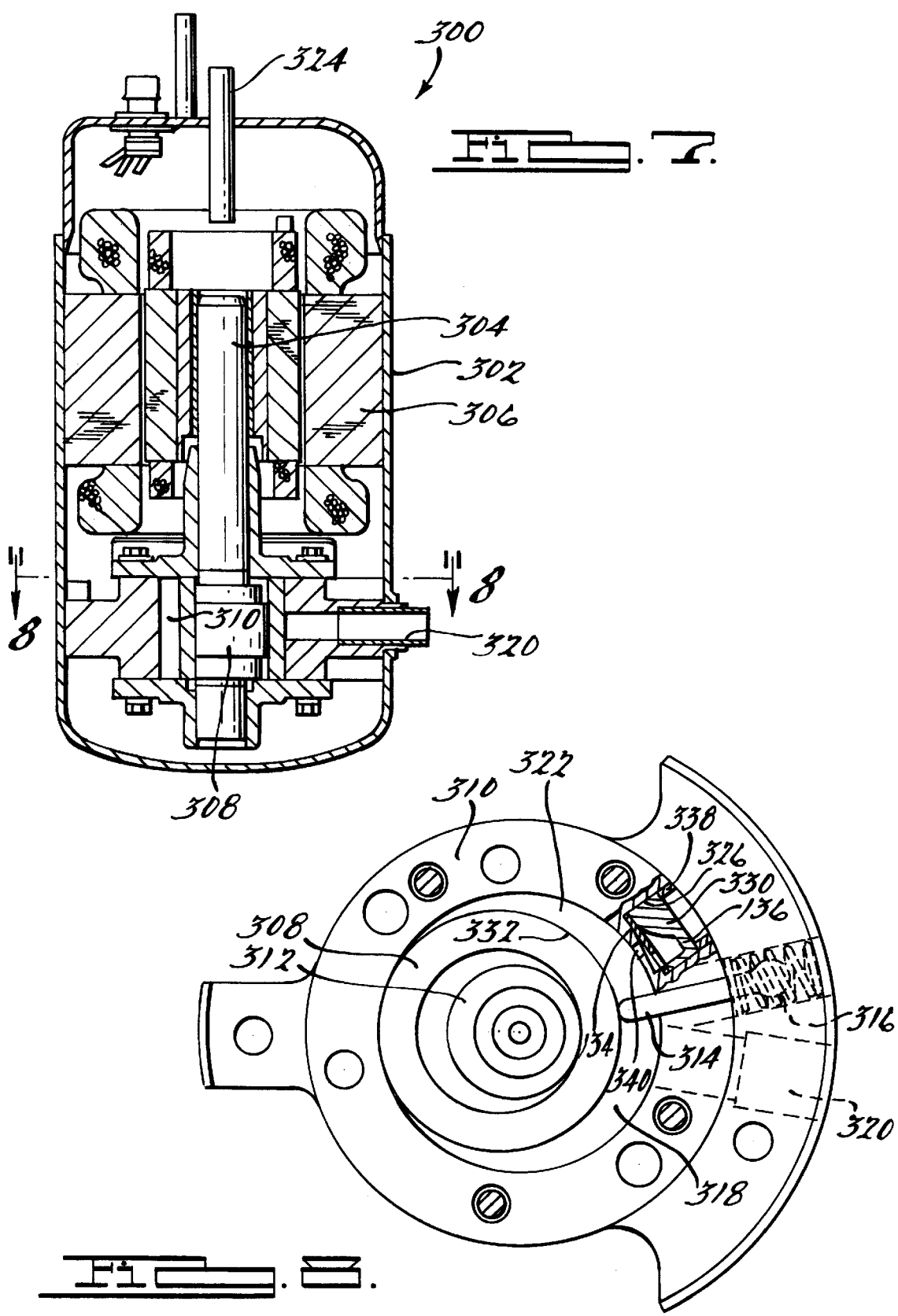

SCROLL MACHINE WITH DISCHARGE VALVE

FIELD OF THE INVENTION

The present invention relates to rotary compressors. More particularly the present invention relates to a unique direct discharge valve incorporating a curved stop plate which is utilized in both a scroll compressor and a rotary compressor.

BACKGROUND OF THE INVENTION

Scroll machines are becoming more and more popular for use as compressors in both refrigeration as well as air conditioning and heat pump applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port towards a center discharge port. An electric motor is normally provided which operates to drive the orbiting scroll member via a suitable drive shaft.

Because scroll compressors depend upon successive chambers for suction, compression, and discharge processes, suction and discharge valves in general are not required. However, the performance of the compressor can be increased with the incorporation of a discharge valve. One of the factors which will determine the level of increased performance is the reduction of what is called recompression volume. The recompression volume is the volume of the discharge chamber and discharge port of the compressor when the discharge chamber is at its smallest volume. The minimization of this recompression volume will result in a maximizing of the performance of the compressor. In addition, when such compressors are shut down, either intentionally as a result of the demand being satisfied, or unintentionally as a result of a power interruption, there is a strong tendency for the backflow of compressed gas from the discharge chamber and to a lesser degree for the gas in the pressurized chambers to effect a reverse orbital movement of the orbiting scroll member and its associated drive shaft. This reverse movement often generates noise or rumble which may be considered objectionable and undesirable. Further, in machines employing a single phase drive motor, it is possible for the compressor to begin running in the reverse direction should a momentary power interruption be experienced. This reverse operation may result in overheating of the compressor and/or other inconveniences to the utilization of the system. Additionally, in some situations, such as a blocked condenser fan, it is possible for the discharge pressure to increase sufficiently to stall the drive motor and effect a reverse rotation thereof. As the orbiting scroll orbits in the reverse direction, the discharge pressure will decrease to a point where the motor again is able to overcome this pressure head and orbit the scroll member in the forward direction. However, the discharge pressure will again increase to a point where the drive motor is stalled and the cycle is repeated. Such cycling is undesirable in that it is self-perpetuating. The incorporation of a discharge valve can reduce or eliminate these reverse rotation problems.

A primary object of the present invention resides in the provision of a very simple and unique discharge valve which is associated with the non-orbiting scroll and which can easily be assembled into a conventional gas compressor of the scroll type without significant modification of the overall compressor design. The discharge valve operates to minimize the recompression volume and at compressor shut down operates to prohibit backflow of the discharge gas through the compressor and thus driving the compressor in the reverse direction. Prohibiting the reverse operation of the compressor eliminates the normal shut down noise and other problems associated with such reverse rotation. The discharge valve is normally open due to the configuration of the valve plate and the valve seat. The normally open configuration for the valve eliminates the force to open the valve as well as eliminating any mechanical device to close the valve. The valve relies on pressure differentials for closing. The stop plate for the discharge valve includes a curved backing surface which guides and supports the movement of the valve plate significantly reducing stresses for the valve plate. A second embodiment of the invention incorporates the unique discharge valve into a rotary vane compressor.

These and other features of the present invention will become apparent from the following description and the appended claims, taken in conjunction with the accompanying drawings.

BRIEF DESCRIPTION OF THE DRAWINGS

In the drawings which illustrate the best mode presently contemplated for carrying out the present invention:

FIG. 4B is an enlarged view of the discharge valve assembly illustrated in FIGS. 1 and 3 having a curved valve seat;

FIG. 5 is an exploded perspective view of the discharge valve assembly shown in FIGS. 1, 3 and 4B;

FIG. 6 is an exploded perspective view of a discharge valve assembly in accordance with another embodiment of the present invention;

FIG. 7 is a vertical sectional view through the center of a rotary compressor which incorporates the discharge valve assembly of the present invention; and FIG. 8 is a cross-sectional view in the direction of arrows 8—8 shown in FIG. 7.

DETAILED DESCRIPTION OF THE PREFERRED EMBODIMENT

Figure 1:
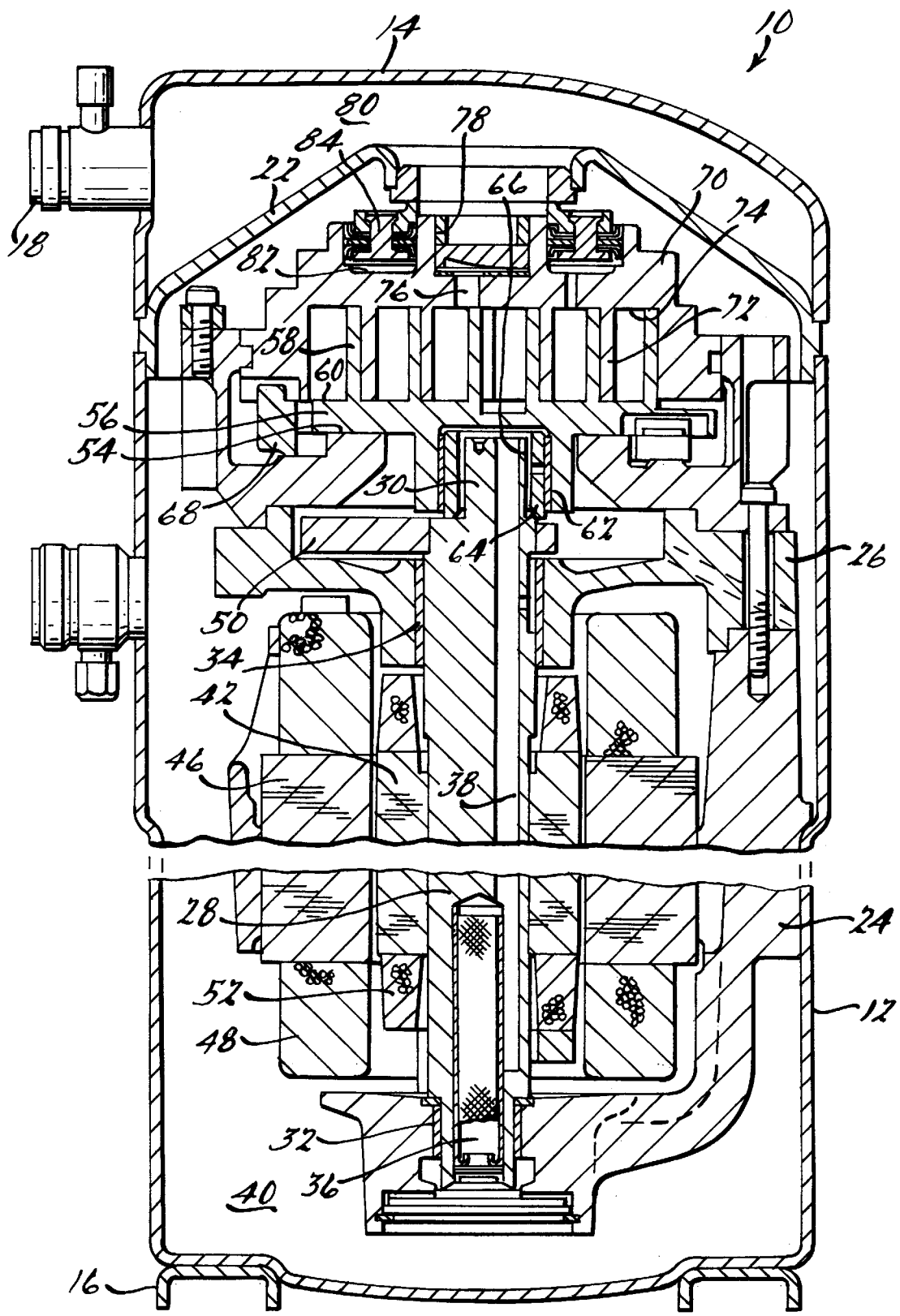
FIG. 1 is a vertical sectional view through the center of a scroll compressor which incorporates a discharge valve assembly in accordance with the present invention.

Referring now to the drawings in which like reference numerals designate like or corresponding parts throughout the several views, there is shown in FIG. 1 a scroll compressor which incorporates a discharge valving system in accordance with the present invention which is designated generally by reference numeral 10. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18. Other major elements affixed to the shell include a transversely extending partition 22 which is welded about its periphery at the same point that cap 14 is welded to shell 12, a main bearing housing 24 which is suitably secured to shell 12 and a two piece upper bearing housing 26 suitably secured to main bearing housing 24.

A drive shaft or crankshaft 28 having an eccentric crank pin 30 at the upper end thereof is rotatably journaled in a bearing 32 in main bearing housing 24 and a second bearing 34 in upper bearing housing 26. Crankshaft 28 has at the lower end a relatively large diameter concentric bore 36 which communicates with a radially outwardly inclined smaller diameter bore 38 extending upwardly therefrom to the top of crankshaft 28. The lower portion of the interior shell 12 defines an oil sump 40 which is filled with lubricating oil to a level slightly above the lower end of a rotor 42, and bore 36 acts as a pump to pump lubricating fluid up the crankshaft 28 and into bore 38 and ultimately to all of the various portions of the compressor which require lubrication.

Crankshaft 28 is rotatively driven by an electric motor including a stator 46, windings 48 passing therethrough and rotor 42 press fitted on the crankshaft 28 and having upper and lower counterweights 50 and 52, respectively.

The upper surface of upper bearing housing 26 is provided with a flat thrust bearing surface 54 on which is disposed an orbiting scroll member 56 having the usual spiral vane or wrap 58 extending upward from an end plate 60. Projecting downwardly from the lower surface of end plate 60 of orbiting scroll member 56 is a cylindrical hub having a journal bearing 62 therein and in which is rotatively disposed a drive bushing 64 having an inner bore 66 in which crank pin 30 is drivingly disposed. Crank pin 30 has a flat on one surface which drivingly engages a flat surface (not shown) formed in a portion of bore 66 to provide a radially compliant driving arrangement, such as shown in assignee's U.S. Pat. No. 4,877,382, the disclosure of which is hereby incorporated herein by reference. An Oldham coupling 68 is also provided positioned between orbiting scroll member 56 and bearing housing 24 and keyed to orbiting scroll member 56 and a non-orbiting scroll member 70 to prevent rotational movement of orbiting scroll member 56. Oldham coupling 68 is preferably of the type disclosed in assignee's co-pending U.S. Pat. No. 5,320,506, the disclosure of which is hereby incorporated herein by reference.

Non-orbiting scroll member 70 is also provided having a wrap 72 extending downwardly from an end plate 74 which is positioned in meshing engagement with wrap 58 of orbiting scroll member 56. Non-orbiting scroll member 70 has a centrally disposed discharge passage 76 which communicates with an upwardly open recess 78 which in turn is in fluid communication with a discharge muffler chamber 80 defined by cap 14 and partition 22. An annular recess 82 is also formed in non-orbiting scroll member 70 within which is disposed a floating seal assembly 84. Recesses 78 and 82 and seal assembly 84 cooperate to define axial pressure biasing chambers which receive pressurized fluid being compressed by wraps 58 and 72 so as to exert an axial biasing force on non-orbiting scroll member 70 to thereby urge the tips of respective wraps 58, 72 into sealing engagement with the opposed end plate surfaces of end plates 74 and 60, respectively. Seal assembly 84 is preferably of the type described in greater detail in U.S. Pat. No. 5,156,539, the disclosure of which is hereby incorporated herein by reference. Non-orbiting scroll member 70 is designed to be mounted to bearing housing 26 in a suitable manner such as disclosed in the aforementioned U.S. Pat. No. 4,877,382 or U.S. Pat. No. 5,102,316, the disclosure of which is hereby incorporated herein by reference.

Figure 2:
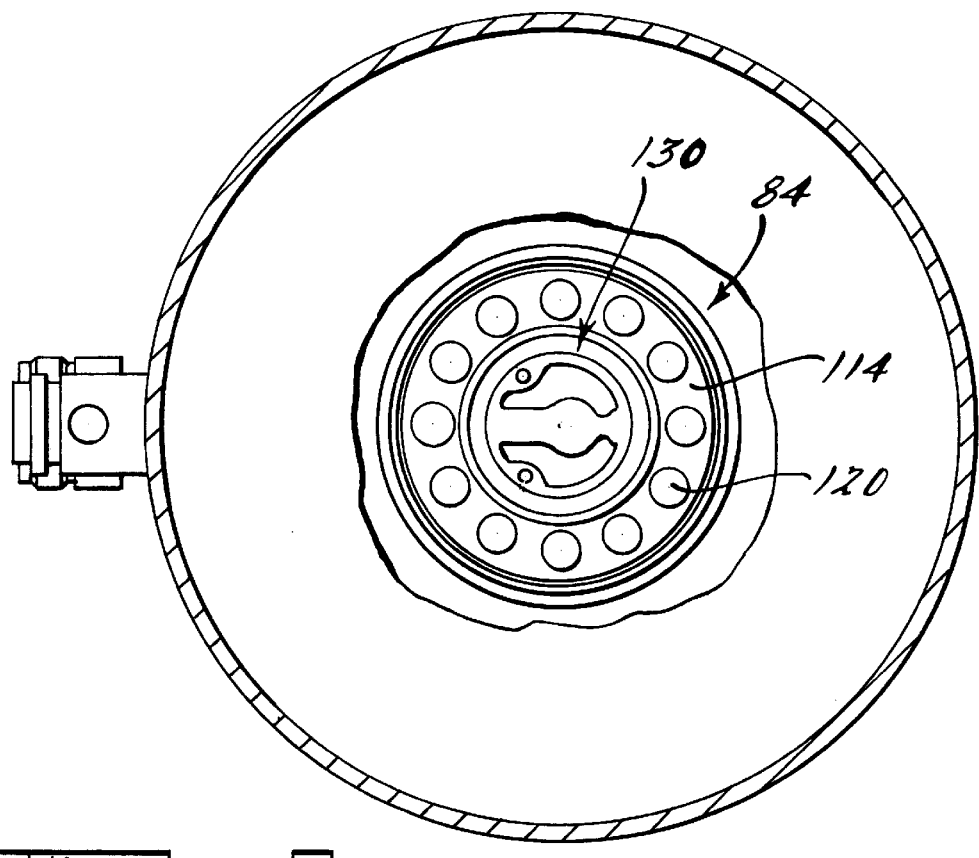
FIG. 2 is a top elevational view of the compressor shown in FIG. 1 with the cap and a portion of the partition removed.
Figure 3:
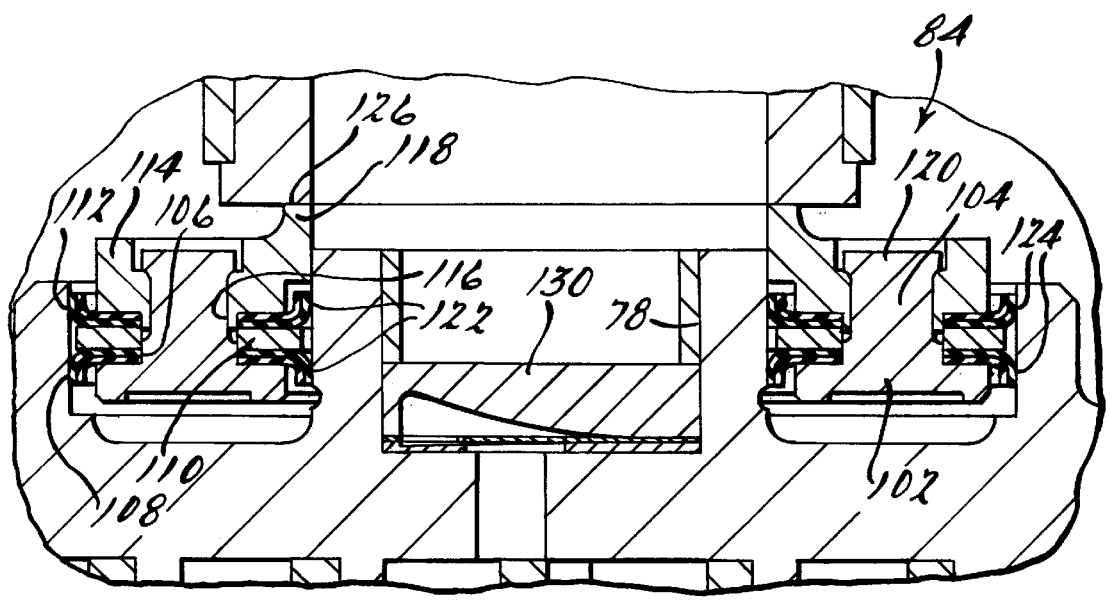
FIG. 3 is an enlarged view of the floating seal assembly and discharge valve assembly illustrated in FIG. 1.

Referring now to FIGS. 2 and 3, floating seal assembly 84 is of a coaxial sandwiched construction and comprises an annular base plate 102 having a plurality of equally spaced upstanding integral projections 104 each having an enlarged base portion 106. Disposed on plate 102 is an annular gasket assembly 108 having a plurality of equally spaced holes which mate with and receive base portions 106. On top of gasket assembly 108 is disposed an annular spacer plate 110 having a plurality of equally spaces holes which also mate with and receive base portions 106. On top of plate 110 is an annular gasket assembly 112 having a plurality of equally spaced holes which mate with and receive projections 104. The assembly of seal assembly 84 is maintained by an annular upper seal plate 114 which has a plurality of equally spaced holes mating with and receiving projections 104. Seal plate 114 includes a plurality of annular projections 116 which mate with and extend into the plurality of holes in annular gasket assembly 112 and spacer plate 110 to provide stability to seal assembly 84. Seal plate 114 also includes an annular upwardly projecting planar sealing lip 118. Seal assembly 84 is secured together by swaging the ends of projections 104 as indicated at 120.

Referring now to FIG. 3, seal assembly 84 therefore provides three distinct seals. First, an inside diameter seal at two interfaces 122, second an outside diameter seal at two interfaces 124 and a top seal at 126. Seals 122 isolate fluid under intermediate pressure in the bottom of recess 82 from fluid in recess 78. Seals 124 isolate fluid under intermediate pressure in the bottom of recess 82 from fluid within shell 12. Seal 126 is between sealing lip 118 and an annular seat portion on partition 22. Seal 126 isolates fluid at suction pressure from fluid at discharge pressure across the top of seal assembly 84.

The diameter and width of seal 126 are chosen so that the unit pressure between sealing lip 118 and the seat portion on partition 22 is greater than normally encountered discharge pressure, thus ensuring consistent sealing under normal operating conditions of compressor 10, i.e., at normal operating pressure ratios. Therefore, when undesirable pressure conditions are encountered, seal assembly 84 will be forced downward breaking seal 126, thereby permitting fluid flow from the discharge pressure zone of compressor 10 to the suction pressure zone of compressor 10. If this flow is great enough, the resultant loss of flow of motor-cooling suction gas (aggravated by the excessive temperature of the leaking discharge gas) will cause a motor protector to trip thereby de-energizing motor 28. The width of seal 126 is chose so that the unit pressure between sealing lip 118 and the seat portion of partition 22 is greater than normally encountered discharge pressure, thus ensuring consistent sealing.

The scroll compressor as thus far broadly described is either now known in the art or is the subject of other pending applications for patent or patents of applicant's assignee.

Figure 4A:
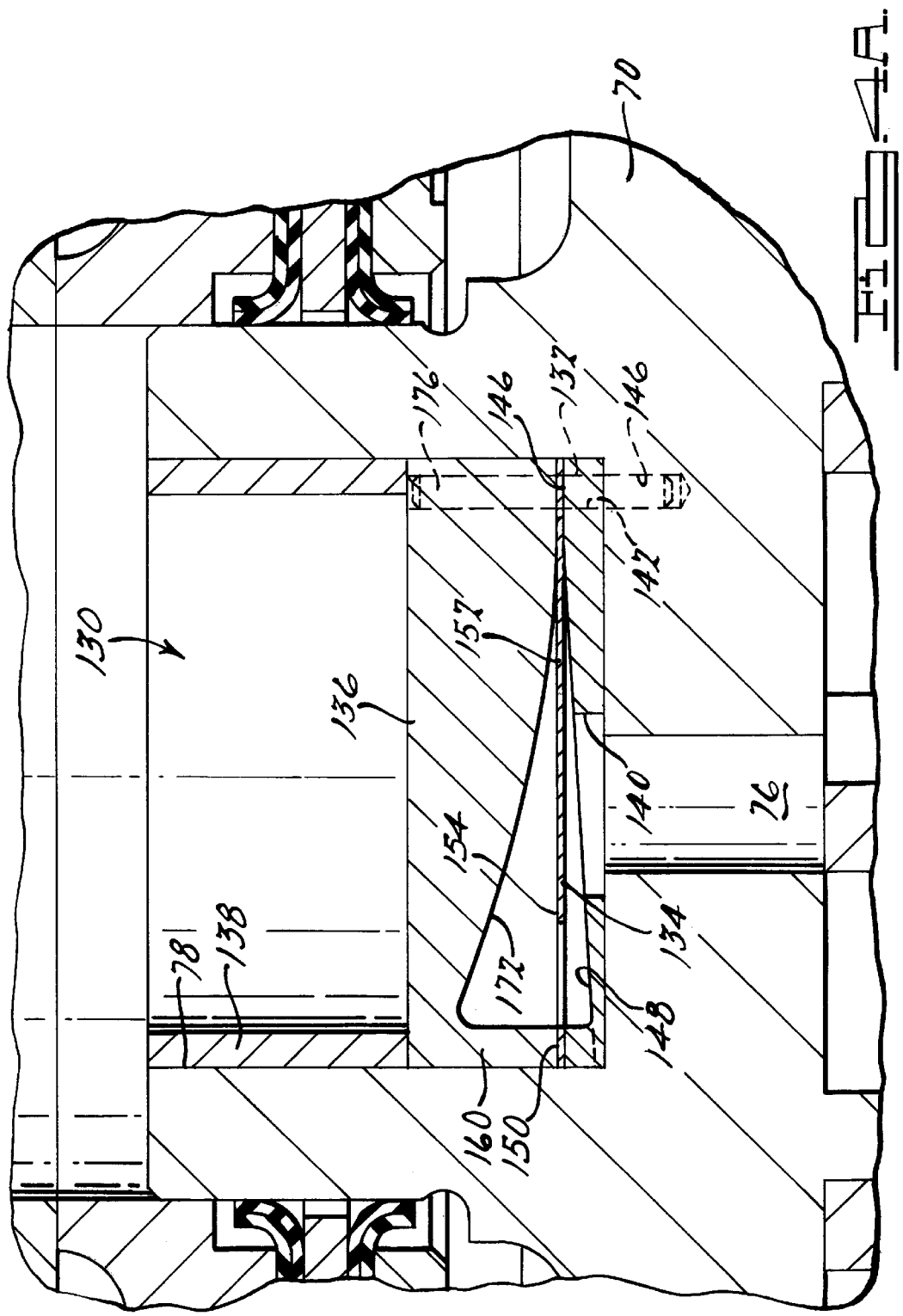
FIG. 4A is an enlarged view of the discharge valve assembly illustrated in FIGS. 1 and 3 having a generally planar valve seat.

The present invention is directed towards a normally open mechanical valve assembly 130 which is disposed within recess 78 which is formed in non-orbiting scroll member 70. Valve assembly 130 moves between a fully closed and a fully open condition during steady state operation of compressor 10. Valve assembly 130 will close during the shut down of compressor 10. When valve assembly 130 is fully closed, the recompression volume is minimized and the reverse flow of discharge gas through scroll members 56 and 70 is prohibited. Valve assembly 130 is normally open as shown in FIGS. 3, 4A and 4B. The normally open configuration for valve assembly 130 eliminates the force required to open valve assembly 130 as well as eliminating any mechanical device to close valve assembly 130. Valve assembly 130 relies on pressure differential for closing.

Referring now to FIGS. 3–5, discharge valve assembly 130 is disposed within recess 78 and it comprises a valve seat 132, a valve plate 134, a valve stop 136 and a retainer 138. Valve seat 132 is a flat metal disc shaped member defining a discharge passage 140, a pair of alignment apertures 142 and a cavity 144. Non-orbiting scroll member 70 defines a pair of alignment bores 146. When apertures 142 are in registry with bores 146, discharge passage 140 is aligned with discharge passage 76. The shape of discharge passage 140 is the same as discharge passage 76. The thickness of valve seat 132, particularly in the area of cavity 144 is minimized to minimize the recompression volume for compressor 10 to increase the performance of compressor 10. The bottom surface of cavity 144 adjacent to valve plate 134 includes a contoured surface 148. The flat horizontal surface of valve seat 132 is used to secure valve plate 134 around its entire circumference. Contoured surface 148 of cavity 144 provides for the normally open characteristic of valve assembly 130. Contoured surface 148 may be a generally planar surface a shown in FIG. 4A or contoured surface 148 may be a curved surface as shown in FIG. 4B while cavity 144 and contoured surface 148 are shown as a pocket within valve seat 132, it is within the scope of the present invention to have cavity 144 and thus surface 148 extend through the edge of valve seat 132 as shown in phantom in FIGS. 4A and 5. Also, it is within the scope of the present invention to eliminate valve seat 132 and incorporate cavity 144 and surface 148 directly into and onto non-orbiting scroll 70 if desired.

Valve plate 134 is a flat thin metal disc shaped member which includes an annular ring 150, a generally rectangular portion 152 extending radially inward from ring 150 and a generally circular portion 154 attached to the radial inner end of rectangular portion 152. Rectangular portion 152 is designed to be smaller in width than circular portion 154. This reduced section is therefore weaker in bending than portion 154 which results in a faster opening of valve assembly 130. This reduced section of portion 152 is acceptable from a durability standpoint since contoured surface 148 reduces the stress loading on this weaker section. The size and shape of portion 154 is designed to completely cover discharge passage 140 of valve seat 132. The generally circular shape of portion 154 eliminates valve breakage which is associated with rectangular valve plates. In general, valve plates can have a tendency to twist during the closing of the valve due to the pressure fluctuations across the valve. When a rectangular shape valve twists before closing, the outside corner of the rectangle will hit first causing high loading and the breakage of the corner. The present invention, by using a generally circular portion to close the valve, eliminates the possibility of this corner breakage. Valve plate 134 also includes a pair of bosses 156 which define a pair of alignment apertures 158. When apertures 158 are in registry with apertures 142 of valve seat 132, rectangular portion 152 positions circular portion 154 in alignment with discharge passage 140. The thickness of valve plate 134 is determined by the stresses developed in rectangular portion 152 as valve plate 134 deflects from its closed position to its open position as described below.

Valve stop 136 is a thick metal disc shaped member which provides support and backing for valve plate 134 and valve seat 132. Valve stop 136 is similar in configuration to valve plate 134 and includes an annular ring 160, a generally rectangular portion 162 extending radially inward from ring 160, a generally circular portion 164 attached to the radially inner end of rectangular portion 162 and a support section 166 extending between circular portion 164 and ring 160 on the side of portion 164 opposite to portion 162. Valve stop 136 also includes a pair of bosses 168 which define a pair of alignment apertures 170. When apertures 170 are in registry with apertures 158 in valve plate 134, rectangular portion 162 is aligned with rectangular portion 152 of valve plate 134 and it positions circular portion 164 in alignment with circular portion 154 of valve plate 134. Rectangular portion 162 and circular portion 164 cooperate to define a curved contoured surface 172.

Discharge valve assembly 130 is assembled to non-orbiting scroll member 70 by first placing valve seat 132 within recess 78 with contoured surface 148 facing upward while aligning apertures 142 with bores 146 which aligns passage 140 with passage 76. Next, valve plate 134 is placed on top of valve seat 132 within recess 78 while aligning apertures 158 with apertures 142 which aligns circular portion 154 with passage 140. Next, valve stop 136 is placed on top of valve plate 134 within recess 78 while aligning apertures 170 within apertures 158 which aligns portions 162 and 164 with portions 152 and 154, respectively. A roll pin 176 is inserted through each aligned set of apertures 170, 158 and 142 and press fit into each bore 146 to maintain the alignment of these components. Finally, retainer 138 is installed within recess 78 to maintain the assembly of valve assembly 130 with non-orbiting scroll member 70. Retainer 138 can be connected to non-orbiting scroll member 70 by being press fit within recess 78, retainer 138 and recess 78 can be threaded to provide the connection or other means known in the art can be used to secure retainer 138 within recess 78. The assembly of retainer 138 sandwiches the entire circumferential ring 150 of valve seat 132 between the upper flat surface of valve seat 132 and ring 160 of valve stop 136 to secure and retain valve plate 134.

Discharge valve assembly 130 is normally in position with valve plate 134 abutting the upper flat surface on valve seat 132. Contoured surface 148 spaces valve plate 134 from valve seat 132 to provide for the normally open characteristic of valve assembly 130. This allows limited fluid flow from discharge muffler chamber 80 into the compression pockets formed by scroll members 56 and 70. In order to close valve assembly 130, fluid pressure within muffler chamber 80 biases valve plate 134 against contoured surface 148 of valve seat 132 when the fluid pressure in chamber 80 is greater than the fluid pressure within the central most fluid pocket formed by scroll members 56 and 70. During operation of compressor 10, the fluid pressure differential between fluid in discharge chamber 80 and fluid within the central most fluid pocket formed by scroll members 56 and 70 will move valve plate 134 between abutment with contoured surface 148 of valve seat 132 and abutment with valve stop 136 or between a closed position and an open position. The normally open position of valve assembly 130 eliminates the force which is required to open a typical discharge valve. The elimination of this force lowers the pressure differential for operating the valve which in turn lowers power losses. In addition the normally open feature reduces the sound generated during the closing of the valve due to the gradual closing of the valve rather than the sudden closure of a normally closed valve. Contoured surface 148 provides for this gradual closing feature. The valve of the present invention operates solely on pressure differentials. Finally, the unique design for valve assembly 130 provides a large flow area to improve the flow characteristics of the system.

Valve plate 134 is sandwiched between valve seat 132 and valve stop 136 with annular ring 160 of valve stop 136 abutting annular ring 150 of valve plate 134 which in turn abuts the upper flat surface of valve seat 132. Rectangular portion 152 and circular portion 154 normally lie in an unstressed condition in a generally horizontal position as shown in FIGS. 4A and 4B. The deflection of valve plate 134 occurs in rectangular portion 152 and circular portion 154. To fully close, portions 152 and 154 deflect toward valve seat 132 and to fully open portions 152 and 154 deflect in the opposite direction toward valve stop 136. The stresses encountered by valve plate 134 are stresses that are both plus and minus in direction from the neutral normally open position. Thus, when comparing the stresses of valve plate 134 with those encountered by the flap valve of a normally closed discharge valve the stresses are significantly reduced. The normally closed flap valve begins in a position adjacent a valve seat when the flap valve is unstressed. As the valve begins to open the stresses begin at the unstressed condition and continue to grow as the flap valve opens. Thus they are undirectional from the unstressed condition. The present invention, by centering the stressed conditions of valve plate 134 on both sides of the unstressed condition significantly reduces the stress loading experienced by valve plate 134.

In order to further reduce the stress loading and thus the life of valve plate 134, the shape of contoured surface 148 of valve seat 132 and contoured surface 172 of valve stop 136 are chosen to ensure a gradual loading and minimizing of the stresses by distributing the loads over a broader area. Finally, the rounded contours and transitions between ring 150, rectangular portion 152 and circular portion 154 are designed to eliminate stress risers. This elimination of stress risers, the equal distribution of the load and the reduction in the maximum stresses encountered significantly improves the life and performance for discharge valve assembly 130.

Referring now to FIG. 6, a discharge valve assembly 230 is illustrated. Discharge valve assembly 230 includes valve seat 132, a valve plate 234, a valve stop 236 and retainer 138. Valve plate 234 performs the same function as valve plate 134 and is interchangeable with valve plate 134. Valve plate 234 is a flat thin metal disc shaped member which includes an annular ring 250, a pair of radially inwardly extending legs 252 and a central portion 254 attached to the radial inner end of legs 252. Legs 252 together are designed to be smaller in width than central portion 254. This reduced section is therefore weaker in bending than portion 254 which results in a faster opening and closing of valve assembly 230. This reduced section of legs 252 is acceptable from a durability standpoint since contoured surface 148 reduces the stress loading on this weaker section. The size and shape of portion 254 is designed to completely cover discharge passage 140 of valve seat 132. The outer peripheral shape of portion 254 is circular and this circular shape eliminates valve breakage which is associated with rectangular valve plates as is detailed above for valve plate 134. Valve plate 234 includes the pair of alignment apertures 158, one being located in each leg 252. When apertures 158 are in registry with apertures 142 of valve seat 132, legs 252 position portion 254 in alignment with discharge passage 140. The thickness of valve plate 234 is determined by the stresses developed in legs 252 as valve plate 234 deflects from its normally open position to its closed position and from its normally open position to its fully open position similar to valve plate 134 as described above.

Valve stop 236 is a thick metal disc shaped member which provides support and bearing for valve plate 234 and valve seat 132. Valve stop 236 is similar in configuration to valve plate 234 and includes an annular ring 260, a pair of legs 262 extending radially inward from ring 260, a central portion 264 attached to the radially inner end of legs 262 and a support section 266 extending between central portion 264 and ring 260 on the side of portion 264 opposing to legs 262. Valve stop 236 also defines the pair of alignment apertures 170. When apertures 170 are in registry with apertures 158 in valve plate 234, legs 262 are aligned with legs 252 of valve plate 234 and central portion 264 is in alignment with central portion 254 of valve plate 234. Legs 262 and central portion 264 cooperate to define a curved contour surface 272.

The assembly, operation and function of discharge valve assembly 230 is the same as that described above for discharge valve assembly 130.

Referring now to FIGS. 7 and 8, a rotary pump is illustrated which incorporates the discharge valving system in accordance with the present invention which is designated generally by the reference numeral 300. Compressor 300 comprises a housing 302, a shaft 304 which is connected to a motor 306 provided in housing 302, a roller 308 eccentrically mounted at the lower end of shaft 304, and a cylinder 310 enclosing roller 308 as shown in FIG. 7. An eccentric 312 (FIG. 8) is attached to shaft 304 and is freely movably disposed in roller 308. On the wall of the cylinder 310, a valve 314 is provided. A spring 316 pushes continuously on the end of valve 314 to bias it against roller 308. As shaft 304 is rotated by motor 306, roller 308 rotates in an eccentric manner to compress the refrigerant taken in to a suction area 318 through a suction pipe 320. The pressurized gas is discharged from a discharge area 322 of cylinder 310 and discharges through a pipe 324 provided at the top of housing 302. Housing 302 defines a recess 326 within which is located a discharge valve assembly 330.

Discharge valve assembly 330 is disposed within recess 326 and it comprises a valve seat 332, valve plate 134, valve stop 136 and a retainer 338. Valve seat 332 is integral with housing 302 and it defines a discharge passage 340 and the pair of alignment apertures 142. While valve seat 332 is being shown as integral with housing 302, it is within the scope of the present invention to machine recess 326 such that it accepts valve seat 132 described above. In this manner, discharge valve assembly 330 could be replaced with discharge valve assembly 130. In addition, discharge valve assembly 230 could also be substituted for valve assembly 330. The surface of valve seat 332 adjacent to valve plate 134 includes a flat surface and contoured surface 148. As shown in FIGS. 4A and 4B, surface 148 may be planar or surface 148 may be curved.

The assembly, operation and function of valve assembly 330 is the same as that described above for valve assemblies 130 and 230.

While the above detailed description describes the preferred embodiment of the present invention, it should be understood that the present invention is susceptible to modification, variation and alteration without deviating from the scope and fair meaning of the subjoined claims.

What is claimed is:

1. A scroll machine comprising:
   a shell defining a discharge chamber;
   a first scroll member disposed in said shell, said first member having a first spiral wrap projecting outwardly from an end plate;
   a second scroll member disposed in said shell, said second scroll member having a second spiral wrap projecting outwardly from an end plate, said second spiral wrap intermeshed with said first spiral wrap;
   a drive member for causing said scroll members to orbit relative to one another whereby said spiral wraps will create pockets of progressively changing volume between a suction pressure zone and a discharge pressure zone, said discharge pressure zone being in fluid communication with said discharge chamber;

a discharge valve disposed between said discharge pressure zone and said discharge chamber, said discharge valve movable between an open position where fluid flow between said discharge pressure zone and said discharge chamber is permitted and a closed position where fluid flow between said discharge chamber and said discharge pressure zone is prohibited, said discharge valve comprising:

a valve seat disposed within a recess defined by one of said first and second scroll members;

a valve plate disposed within said recess adjacent said valve seat, said valve plate including a movable portion being movable between a position adjacent said valve seat to place said discharge valve in said closed position and a position spaced from said valve seat to place said discharge valve in said open position; and a valve stop disposed within said recess adjacent said valve plate, said valve stop defining a contoured surface for controlling said movement of said movable portion of said valve plate.

2. The scroll machine according to claim 1 wherein, said valve plate includes a first annular ring.

3. The scroll machine according to claim 2 wherein, said movable portion of said valve plate includes a first generally rectangular portion extending radially inward from said first annular ring.

4. The scroll machine according to claim 3 wherein, said movable portion of said valve plate includes a first generally circular portion attached to said first generally rectangular portion.

5. The scroll machine according to claim 4 wherein, said one of said first and second scroll members defines a first discharge passage disposed within said recess and said valve seat defines a second discharge passage extending through said valve seat, said discharge valve further comprising means for aligning said second discharge passage with said first discharge passage and for aligning said first generally circular portion with said second discharge passage.

6. The scroll machine according to claim 4 wherein, said valve stop includes a second annular ring and said contoured surface of said valve stop is defined by a second generally rectangular portion extending radially inward from said second annular ring and a second generally circular portion attached to said second generally rectangular section.

7. The scroll machine according to claim 6 wherein, said one of said first and second scroll members defines a first discharge passage disposed within said recess and said valve seat defines a second discharge passage extending through said valve seat, said discharge valve further comprising means for aligning said second discharge passage with said first discharge passage and for aligning said first generally circular portion with said second discharge passage and for aligning said second circular portion with said first circular portion.

8. The scroll machine according to claim 6 wherein, said valve stop includes a support section attached between said second generally circular portion and said annular ring.

9. The scroll machine according to claim 1 wherein said valve stop includes an annular ring and said contoured surface is defined by a generally rectangular portion extending radially inward from said annular ring and a generally circular portion attached to said generally rectangular section.

10. The scroll machine according to claim 9 wherein, said one of said first and second scroll members defines a first discharge passage disposed within said recess and said valve seat defines a second discharge passage extending through said valve seat, said discharge valve further comprising means for aligning said second discharge passage with said first discharge passage and for aligning said generally circular portion with said second discharge passage.

11. The scroll machine according to claim 9 wherein, said valve stop includes a support section attached between said generally circular portion and said annular ring.

12. The scroll machine according to claim 1, wherein said discharge valve is normally open.

13. The scroll machine according to claim 1, wherein said valve seat includes a flat surface and a contoured surface, said contoured surface normally being spaced from said valve plate.

14. The scroll machine according to claim 13, wherein said discharge valve is normally open.

15. The scroll machine according to claim 13 wherein said contoured surface is flat.

16. The scroll machine according to claim 13 wherein said contoured surface is curved.

17. The scroll machine according to claim 1 wherein said valve plate includes a stationary portion adjacent said valve seat, said movable portion defining a first section attached to said stationary portion and a second section attached to said first section, said first section having a smaller cross-sectional area than said second section.

18. The scroll machine according to claim 1 wherein said movable portion of said valve plate has a curved exterior edge.

19. A rotary compressor comprising:

a shell defining a discharge chamber;

a housing disposed within said shell, said housing defining a chamber;

a roller disposed within said chamber;

a vane disposed between said housing and said roller, said vane dividing said chamber into a suction area and a discharge area, said discharge area being in fluid communication with said discharge chamber;

a drive member for causing said roller to rotate within said chamber whereby fluid in said suction area progressively changes volume as it is moved into said discharge area;

a discharge valve disposed between said discharge area and said discharge chamber, said discharge valve movable between an open position where fluid flow between said discharge area and said discharge chamber is permitted and a closed position where fluid flow between said discharge chamber and said discharge area is prohibited, said discharge valve comprising:

a valve seat disposed within a recess defined by said housing;

a valve plate disposed within said recess adjacent said valve seat, said valve plate defining a movable portion being movable between a position adjacent said valve seat to place said discharge valve in said closed position and a position spaced from said valve seat to place said discharge valve in said open position; and a valve stop disposed within said recess adjacent said valve plate, said valve stop defining a contoured surface for controlling said movement of said movable portion of said valve plate.

20. The rotary compressor according to claim 19 wherein, said valve plate includes a first annular ring.

21. The rotary compressor according to claim 20 wherein, said movable portion of said valve plate includes a first generally rectangular portion extending radially inward from said first annular ring.

22. The rotary compressor according to claim 21 wherein, said movable portion of said valve plate includes a first generally circular portion attached to said first generally rectangular portion.

23. The rotary compressor according to claim 22 wherein, said valve stop includes a second annular ring and said contoured surface of said valve stop is defined by a second generally rectangular portion extending radially inward from said second annular ring and a second generally circular portion attached to said second generally rectangular section.

24. The rotary compressor according to claim 23 wherein, said valve stop includes a support section attached between said second generally circular portion and said annular ring.

25. The rotary compressor according to claim 19 wherein said valve stop includes an annular ring and said contoured surface is defined by a generally rectangular portion extending radially inward from said annular ring and a generally circular portion attached to said generally rectangular section.

26. The rotary compressor according to claim 25 wherein, said valve stop includes a support section attached between said generally circular portion and said annular ring.

27. The rotary compressor according to claim 19, wherein said discharge valve is normally open.

28. The rotary compressor according to claim 19, wherein said valve seat includes a flat surface and a contoured surface, said contoured surface normally being spaced from said valve plate.

29. The rotary compressor according to claim 19 wherein said valve plate includes a stationary portion adjacent said valve seat, said movable portion defining a first section attached to said stationary portion sand a second section attached to said first section, said first section having a smaller cross-sectional area than said second section.

30. The rotary compressor according to claim 19 wherein said movable portion of said valve plate has a curved exterior edge.

* * * * *

UNITED STATES PATENT AND TRADEMARK OFFICE
CERTIFICATE OF CORRECTION

PATENT NO. : 6,139,291
DATED : October 31, 2000
INVENTOR(S) : Michael M. Perevozchikov It is certified that error appears in the above-identified patent and that said Letters Patent is hereby corrected as shown below:

Column 4, line 5, "spaces" should be -- spaced --.

Column 5, line 18, "a" should be -- as --.

Column 7, line 15, "undirectional" should be -- unidirectional --.

Column 12, line 13, "sand" should be -- and --.

Signed and Sealed this

Eighth Day of May, 2001

*Attest:*

NICHOLAS P. GODICI

*Attesting Officer*     *Acting Director of the United States Patent and Trademark Office*